United States Patent
Yeh et al.

(10) Patent No.: US 10,916,831 B2
(45) Date of Patent: Feb. 9, 2021

(54) PROTECTIVE SHELL

(71) Applicant: PEGATRON CORPORATION, Taipei (TW)

(72) Inventors: Mei-Yin Yeh, Taipei (TW); Shyh-Heh Hwang, Taipei (TW); Ho-Ching Huang, Taipei (TW); Hui-Chen Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 681 days.

(21) Appl. No.: 15/628,660

(22) Filed: Jun. 21, 2017

(65) Prior Publication Data
US 2018/0076506 A1 Mar. 15, 2018

(30) Foreign Application Priority Data
Sep. 12, 2016 (TW) .............................. 105129630 A

(51) Int. Cl.
| | | |
|---|---|---|
| *H01Q 1/24* | (2006.01) | |
| *H04M 1/18* | (2006.01) | |
| *H01Q 9/30* | (2006.01) | |
| *H01Q 21/28* | (2006.01) | |
| *H01Q 1/48* | (2006.01) | |
| *H04M 1/02* | (2006.01) | |
| *H01Q 1/38* | (2006.01) | |

(52) U.S. Cl.
CPC ............... *H01Q 1/243* (2013.01); *H01Q 1/48* (2013.01); *H01Q 9/30* (2013.01); *H01Q 21/28* (2013.01); *H04M 1/026* (2013.01); *H04M 1/185* (2013.01); *H01Q 1/38* (2013.01)

(58) Field of Classification Search
CPC ............ H01Q 1/22; H01Q 1/243; H01Q 1/38; H01Q 1/48; H01Q 1/24
See application file for complete search history.

(56) References Cited

U.S. PATENT DOCUMENTS

| 6,891,505 B2* | 5/2005 | Kurjenheimo | ......... | H01Q 1/243 |
| | | | | 343/700 MS |
| 8,289,215 B2* | 10/2012 | Hsu | ......................... | G01S 19/36 |
| | | | | 343/702 |
| 9,001,003 B2* | 4/2015 | Chen | ...................... | H01Q 5/335 |
| | | | | 343/876 |
| 2004/0222924 A1* | 11/2004 | Dean | ..................... | C08L 101/12 |
| | | | | 343/700 MS |

(Continued)

FOREIGN PATENT DOCUMENTS

| CN | 202205524 U | 4/2012 |
| CN | 105633547 A | 6/2016 |

(Continued)

*Primary Examiner* — Hasan Z Islam
(74) *Attorney, Agent, or Firm* — McClure, Qualey & Rodack, LLP

(57) ABSTRACT

A protective shell is provided for an electronic device with a built-in antenna. The protective shell includes a plate body, a first penetrating part and an auxiliary grounding element. The first penetrating part is located on the plate body in correspondence with the built-in antenna of the electronic device. The first penetrating part is made of insulating material. The auxiliary grounding element is disposed on the plate body in correspondence with a ground wire of the built-in antenna of the electronic device.

8 Claims, 5 Drawing Sheets

(56) References Cited

U.S. PATENT DOCUMENTS

| | | | |
|---|---|---|---|
| 2007/0296638 A1* | 12/2007 | Kim | H01Q 1/243 |
| | | | 343/702 |
| 2008/0191954 A1* | 8/2008 | Tsujimura | H01Q 1/2266 |
| | | | 343/787 |
| 2009/0315788 A1* | 12/2009 | Hirota | G06F 1/1616 |
| | | | 343/702 |
| 2016/0156094 A1* | 6/2016 | Lo | H01Q 1/243 |
| | | | 343/702 |

FOREIGN PATENT DOCUMENTS

| | | | |
|---|---|---|---|
| JP | 2003179674 A | 6/2003 |
| TW | I286921 B | 9/2007 |
| TW | 200845868 A | 11/2008 |
| TW | 200929698 A | 7/2009 |
| TW | M380585 U | 5/2010 |
| TW | 201513767 A | 4/2015 |

\* cited by examiner

PROTECTIVE SHELL

RELATED APPLICATIONS

This application claims the priority benefit of Taiwan application serial no. 105129630, filed on Sep. 12, 2016. The entirety of the above-mentioned patent application is hereby incorporated by reference herein and made a part of this specification.

BACKGROUND

Technology Field

The disclosure relates to a protective shell and, more particularly, to a protective shell covering a back of an electronic device.

Description of the Related Art

As electronic products have been innovatively developed and people have higher and higher demands on functions of the electronic products, it is too basic for the electronic device just to receive wireless signals. In general, a built-in antenna, for industrial production, is used as a component to receive wireless signals.

However, the lighter and the smaller the electronic products have become in appearance and size, the less the electronic products could use for the built-in antenna installation. In this way, how to reduce the size of the electronic products as well as maintain the performance of electronic products on the wireless signal reception undoubtedly has become an important issue for the industry.

SUMMARY

According to one aspect of the present invention, the present invention provides a protective shell to improve quality of wireless signal reception for an electronic device covered by the protective shell.

According to an embodiment of the present invention, a protective shell is provided for an electronic device with a built-in antenna. The protective shell includes a plate body, a first penetrating part and auxiliary grounding element. The first penetrating part is located at the plate body in correspondence with the built-in antenna of the electronic device. The first penetrating part is made of insulating material. The auxiliary grounding element is disposed at the plate body in correspondence with a ground wire of the built-in antenna of the electronic device.

According to an embodiment of the present invention, the plate body includes at least one first through-hole in correspondence with the built-in antenna of the electronic device and the first penetrating part is located at the first through-hole.

According to an embodiment of the present invention, the auxiliary grounding element is copper foil.

According to an embodiment of the present invention, the auxiliary grounding element is conductive foam.

According to an embodiment of the present invention, the auxiliary grounding element and the plate body have One-Piece structure.

According to an embodiment of the present invention, the protective shell further includes at least one sidewall disposed on at least one side of the plate body. The sidewall and the plate body form an accommodation space to accommodate at least a part of the electronic device, wherein the plate body and the sidewall are made of metallic material.

According to an embodiment of the present invention, the electronic device further includes an expansion interface connected with a cable of the built-in antenna, and the protective shell further comprises a Pogo pin structure disposed in correspondence with the expansion interface.

According to an embodiment of the present invention, the plate body further includes at least one second through-hole, and the protective shell further includes a second penetrating part and an antenna structure. The second penetrating part is located at the second through-hole and made of insulating material. The antenna structure is located at the second penetrating part and electrically connected with the Pogo pin structure.

According to an embodiment of the present invention, the antenna structure is a flexible printed circuit (FPC) antenna.

According to an embodiment of the present invention, the antenna structure is a laser direct structuring (LDS) antenna.

Compared to the prior art, the embodiments of the present invention have at least advantages as follows:

(1) Since the auxiliary grounding element corresponds to the position of the ground wire of the built-in antenna, which enhances a grounding effect of the built-in antenna of the electronic device, the built-in antenna can effectively filter out the noise while receiving wireless signals and thereby the quality of the wireless signal reception for the electronic device can be improved.

(2) Since the protective shell can further include the antenna structure coupled with the Pogo pin structure and the cable of the built-in antenna is connected with the expansion interface, the performance of the overall antenna radiation can be enhanced by connecting the Pogo pin structure with the expansion interface of the electronic device.

(3) The auxiliary grounding element does affect the performance of the built-in antenna on the wireless signal reception since the auxiliary grounding element is adjacent to the first penetrating part; in other words, the auxiliary grounding element does not isolate the built-in antenna from the first penetrating part.

These and other features, aspects, and advantages of the present invention will become better understood with regard to the following description, appended claims, and accompanying drawings.

DETAILED DESCRIPTION

Figure 1:
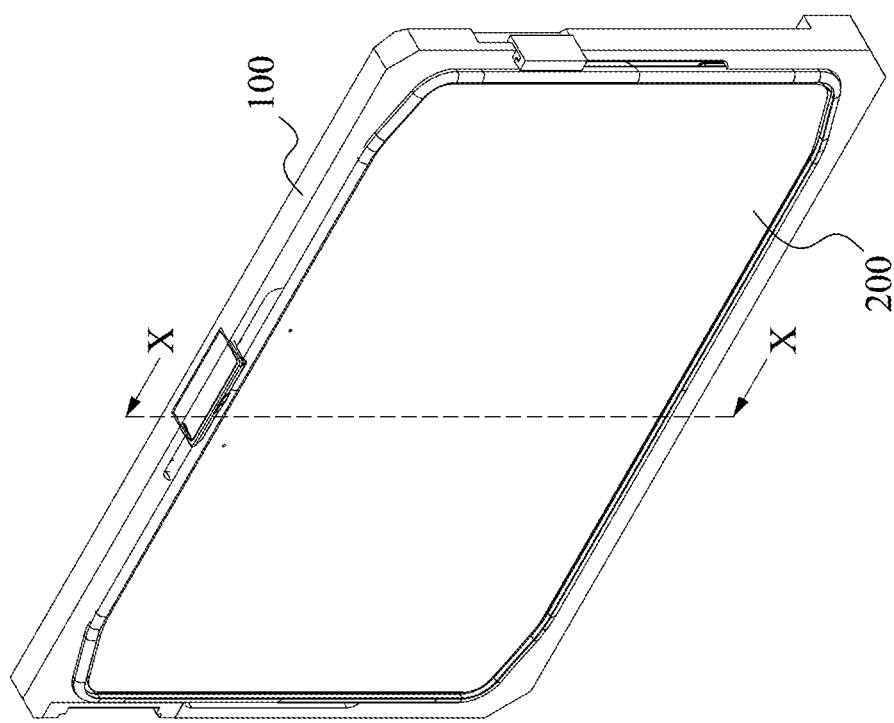
FIG. 1 is a schematic diagram of a protective shell applied on an electronic device according to an embodiment of the present invention.

Hereinafter, the embodiments of the present invention will be disclosed by drawings, and a number of practical details will be described in the following description for clarity. It should be understood, however, that these practical details are not intended to limit the invention. That is, in some embodiments of the present invention, these practical details are not necessary. In addition, for simplicity, some conventionally well-known structures and elements will be schematically illustrated in the drawings.

Unless otherwise defined, all terminologies (including technical and scientific terms) used herein have their ordinary meanings, and their implication should be understood by those skilled in the art. Furthermore, the definitions of the above-mentioned terminologies in common dictionaries should be interpreted as consistent in the content of this specification as in the related fields of the present invention. Unless otherwise specifically defined, these terminologies will not be ideally or over formally interpreted.

Please refer to FIG. 1, which illustrates a schematic diagram of a protective shell 100 according to an embodiment of the present invention. As shown in FIG. 1, the protective shell 100 is used for covering a back 210 of an electronic device 200 (the back 210 can be found in FIG. 2). Thus, the electronic device 200 can be protected by the protective shell 100. In practice, the protective shell 100 can be further used for connecting with a stand or a holder (not shown in FIG. 1) to provide the electronic device 200 a support or fasten the electronic device 200.

Figure 2:
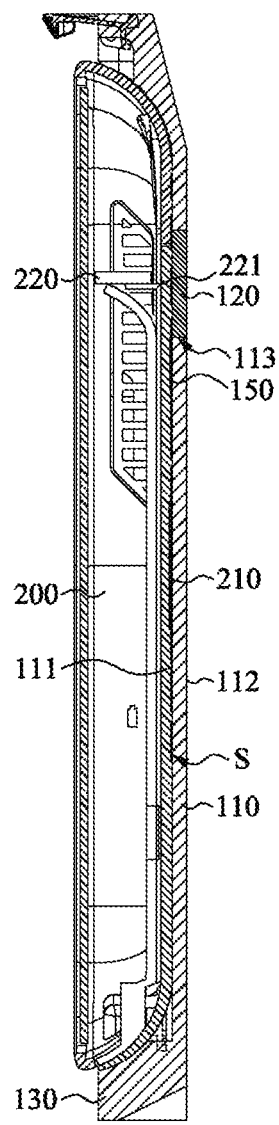
FIG. 2 is a cross-sectional view along the line segment X of FIG. 1.
Figure 3:
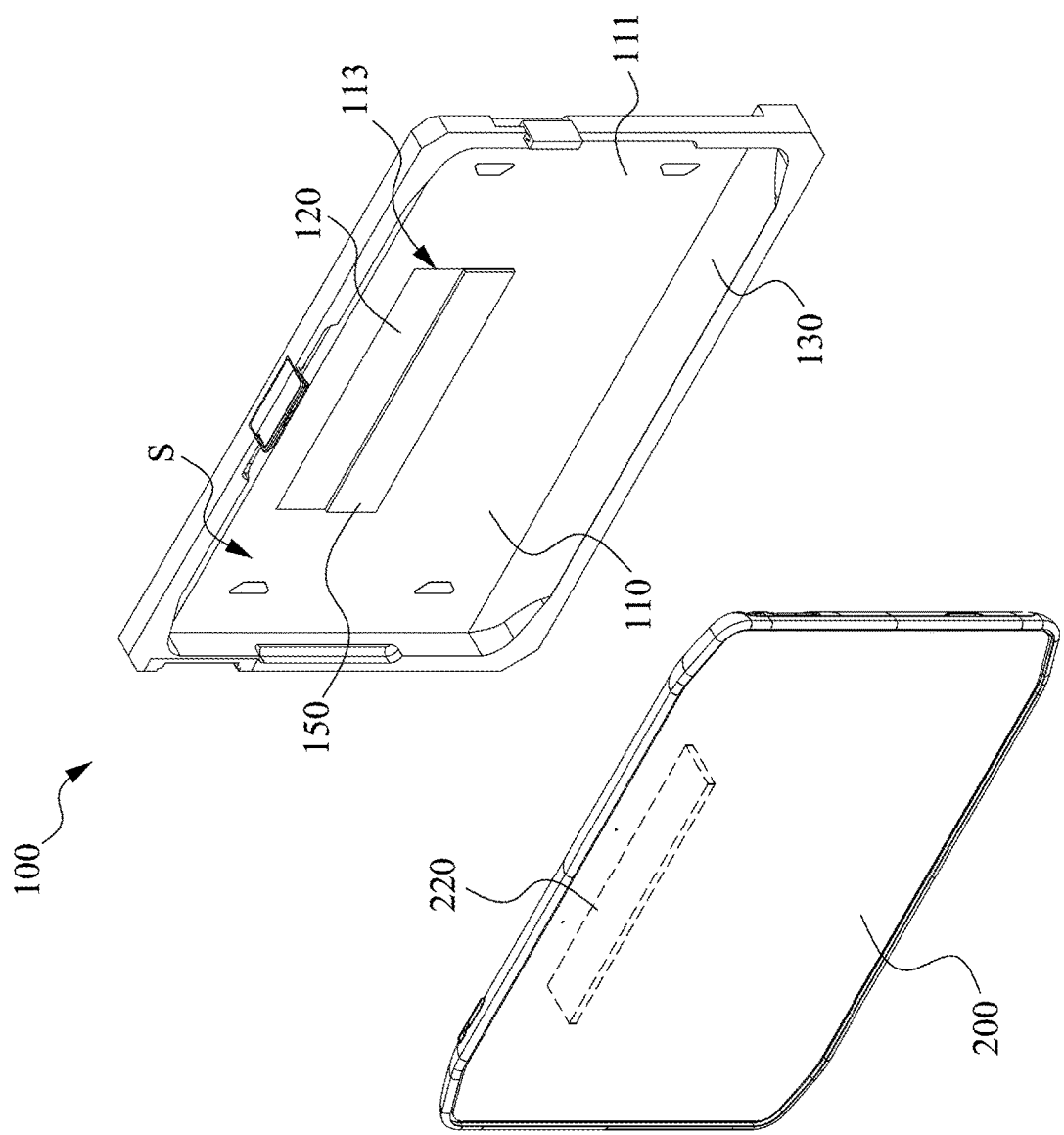
FIG. 3 is a schematic diagram of the protective shell and the electronic device in FIG. 1 prior to assembly.

Furthermore, please refer to FIGS. 2 and 3. FIG. 2 illustrates a cross sectional view along the segment X in FIG. 1; FIG. 3 illustrates a schematic diagram of the protective shell 100 and the electronic device 200 prior to assembly. As shown in FIGS. 2 and 3, the protective shell 100 includes a plate body 110, a first penetrating part 120, a sidewall 130 and at least one auxiliary grounding element 150. The plate body 110 has a first surface 111 and a second surface 112 opposite each other. The plate body 110 further has at least one first through-hole 113 passing through the first surface 111 and the second surface 112. The first through-hole 113 corresponds to a built-in antenna 220 of the electronic device 200. The first penetrating part 120 is located at the first through-hole 113 and made of insulating material. The insulating material could be plastic. The sidewall 130 is disposed on at least one side of the plate body 110 and forms an accommodation space S with the first surface 111 of the plate body 110. The accommodation space S is used for accommodating at least a part of the back 210 of the electronic device 200. The auxiliary grounding element 150 is in contact with the electronic device 200 and corresponds to the position of the ground wire 221 of the built-in antenna 220 of the electronic device 200. In the embodiments of the present invention, the auxiliary grounding element 150 is adjacent to the first penetrating part 120.

To be more specific, since the auxiliary grounding element 150 of the protective shell 100 corresponds to the position of the ground wire 221 of the built-in antenna 220 of the electronic 200, the grounding effect of the built-in antenna 220 of the electronic device 200 is enhanced. The built-in antenna 220, therefore, is able to filter out the noise more efficiently and further improves the quality of the wireless signal reception.

Besides, the wireless signal can pass through the first penetrating part 120 from the outside of the protective shell 100 and arrive at the built-in antenna 220 because the position of first through-hole 113 of the plate body 110 corresponds to the position of the built-in antenna 220 of the electronic device 200, and the first penetrating part 120 is located at the first through-hole 113, and the first penetrating part 120 is made of the insulating material. In other words, the performance of the built-in antenna 220 on the wireless signal reception is not affected by the protective shell 100 covering the back 210 of the electronic device 200.

Moreover, the auxiliary grounding element 150 is adjacent to the first penetrating part 120, that is, the auxiliary grounding element 150 does not insulate the built-in antenna 220 from the first penetrating part 120; as a result, the auxiliary grounding element 150 does not affect the performance of the built-in antenna 220 on the wireless signal reception.

In a practical implementation, the auxiliary grounding element 150 is conductive material, such as copper foil or conductive foam. Based on the implementations, the auxiliary grounding element 150 could be made of the same metallic material as the plate body 110. Furthermore, the auxiliary grounding element 150 and the plate body 110 could be, but not limited to, a one-piece structure.

Figure 4:
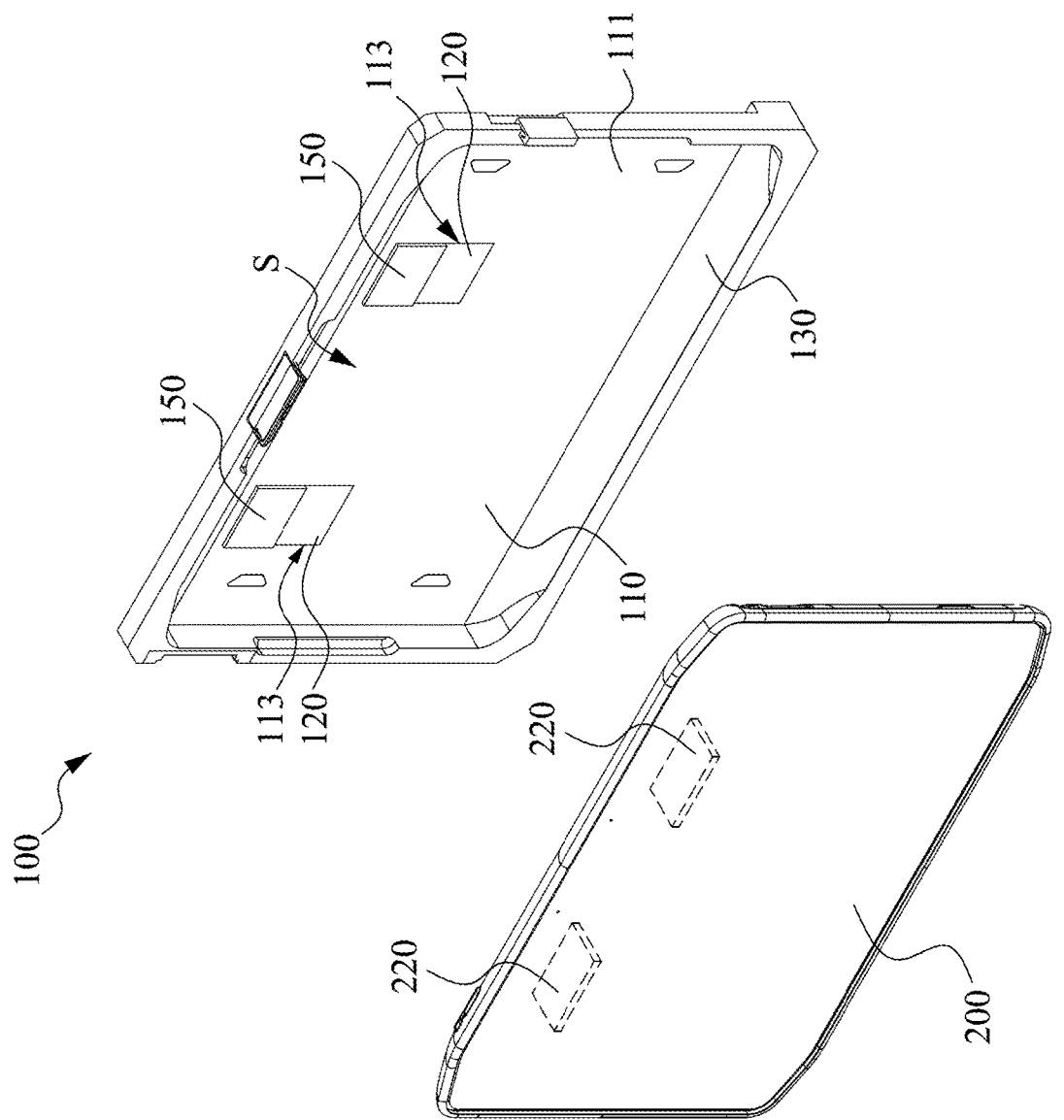
FIG. 4 is a schematic diagram of a protective shell and an electronic device prior to assembly according to another embodiment of the present invention.

Please refer to FIG. 4, which is a schematic diagram of the protective shell 100 and the electronic device 200 prior to assembly according to another embodiment of the present invention. In this embodiment, regarding the number and the position of the built-in antenna 220 of the electronic device 200, the number of the auxiliary grounding element 150 could be set to more than one. For example, the number of the first penetrating part 120 is two, as shown in FIG. 4; the number of the auxiliary grounding element 150 is two as well. The number and the positions of the auxiliary grounding element 150 correspond to the ones of the grounding wire 221 of the built-in antenna 220 (which can be found in FIG. 2).

Figure 5:
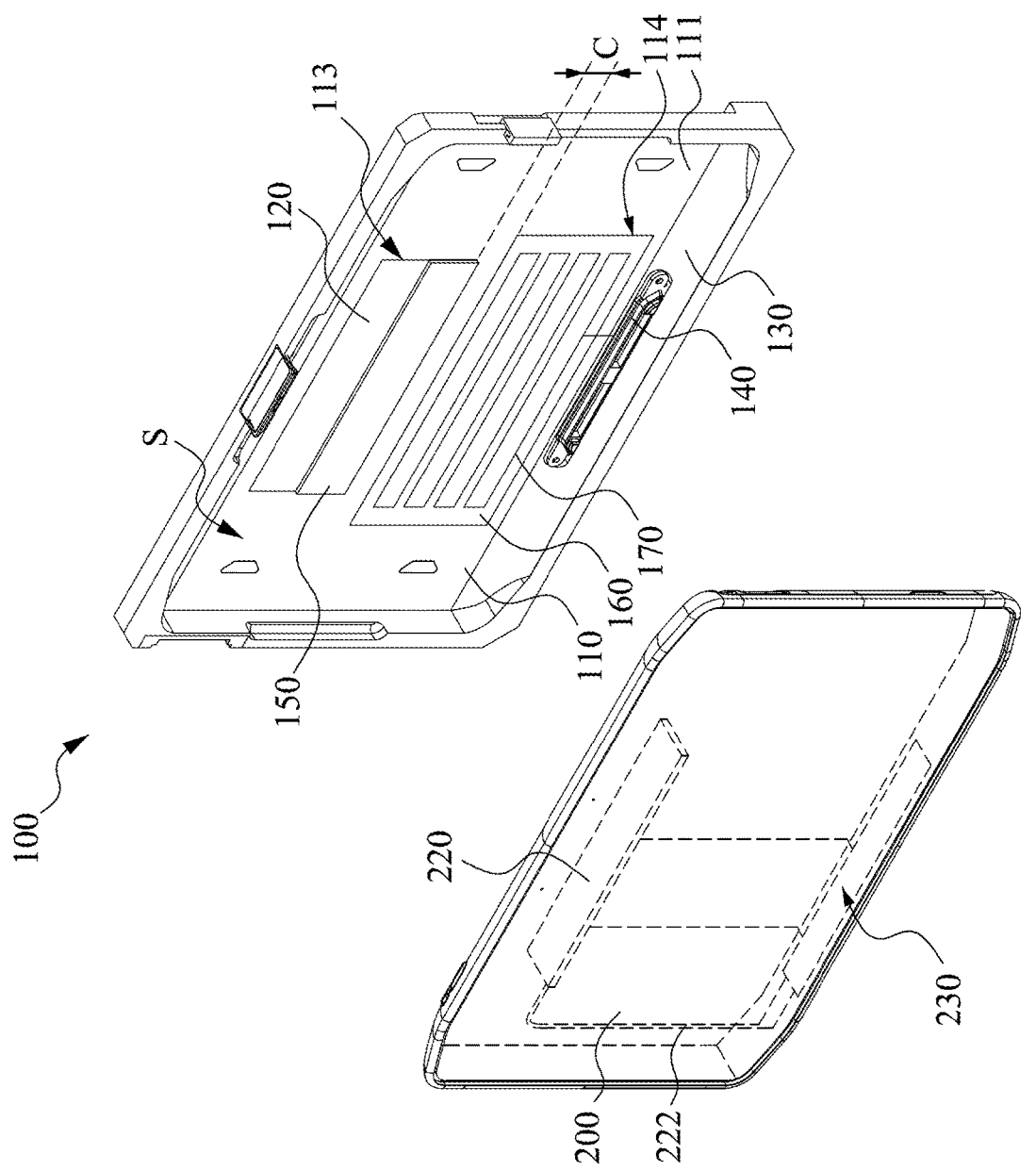
FIG. 5 is a schematic diagram of a protective shell and an electronic device prior to assembly according to yet another embodiment of the present invention.

Please refer to FIG. 5, which is a schematic diagram of the protective shell 100 and the electronic device 200 prior to assembly according to another embodiment of the present invention. As shown in FIG. 5, the electronic device 200 further includes an expansion interface 230, and the cable of the built-in antenna 220 is electrically connected with the expansion interface 230. In addition, the protective shell 100 further includes a Pogo pin structure 140. The Pogo pin structure 140 is disposed on the sidewall 130 and located in the accommodation space S; the Pogo pin structure 140 corresponds to the position of the expansion interface 230.

Moreover, the plate body 110 further includes a second through-hole 114. Likewise, the second through-hole 114 passes through the first surface 111 and the second surface 112. The protective shell 100 further includes a second penetrating part 160 and an antenna structure 170. The second penetrating part 160 is located at the second through-hole 114 and the second penetrating part 160 is made of insulating material. The antenna structure 170 is located at the second penetrating part 160 and on the first surface 111, the side facing the electronic device 220; and the antenna structure 170 is coupled with the Pogo pin structure 140.

In other words, since the Pogo pin structure 140 corresponds to the expansion interface 230, and the cable 222 of the built-in antenna 220 is electrically connected with the expansion interface 230; the cable 222 of the built-in antenna 220 can connect with the antenna structure 170 via the Pogo pin structure 140 of the protective shell 100, thereby improving the overall radiation performance of the antenna. In a practical implementation, the plate body 110 and the sidewall 130 could be made of metallic material, as well as, insulating material, for example, plastic material, coated by a metal substance; but the present invention is not limited thereto.

Likewise, since the second penetrating part 160 is made of the insulating material, wireless signals can pass through the second penetrating part 160 and arrive at the antenna structure 170. That is, the performance of the antenna structure 170 on wireless signal reception is not affected by being blocked by the second penetrating part 160.

Furthermore, as mentioned above, the antenna structure 170 is connected to the Pogo pin structure 140, and the Pogo pin structure 140 corresponds to the expansion interface 230. This allows the antenna structure 170 to connect with the built-in antenna 220 of the electronic device 200. As a result, the antenna structure 170 can be exploited as an external antenna for the built-in antenna 220, and thereby the performance of the electronic device 200 on the wireless signal reception can be effectively improved.

In a practical implementation, the antenna structure 170 may be a flexible circuit print (FCP) antenna or a laser direct structuring antenna based on practical situations.

Besides, the protective shell 100 further includes a keep-out zone C as shown in FIG. 5. The keep-out zone C is located between the auxiliary grounding element 150 and the antenna structure 170 to prevent the performance of the antenna structure 170 on the wireless signal reception from being affected by the auxiliary grounding element 150.

In summary, the technical features of the present invention have obvious advantages and a better performance, compared to the prior art. With the above-mentioned technical features, the present invention can achieve sufficient inventiveness and be widely utilized in industry. The embodiment of the present invention has the following advantages:

(1) The built-in antenna can efficiently filter out the noise during the wireless signal reception, and thereby the quality of the wireless signal reception for the built-in antenna is improved since the auxiliary grounding element of the protective shell corresponds to the position of the ground wire of the built-in antenna of the electronic device, which enhances the grounding effect of the built-in antenna.

(2) The protective shell can further include an antenna structure coupled with the Pogo pin structure, and the cable of the built-in antenna is connected to the expansion interface; therefore, the overall radiation performance of the antenna can be boosted by connecting the Pogo pin structure with the expansion interface.

(3) The performance of the built-in antenna on the wireless signal reception is not affected by the auxiliary grounding element since the auxiliary grounding element is adjacent to the first penetrating part; in other words, the auxiliary grounding element does not isolate the built-in antenna from the first penetrating part.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A protective shell for an electronic device with a built-in antenna, the protective shell comprising:
    a plate body;
    a first penetrating part located at the plate body in correspondence with the built-in antenna of the electronic device, and the first penetrating part made of insulating material;
    at least one auxiliary grounding element disposed at the plate body in correspondence with a ground wire of the built-in antenna of the electronic device; and
    a Pogo pin structure,
    wherein the electronic device further comprises an expansion interface electrically connected with a cable of the built-in antenna, and the Pogo pin structure is disposed in correspondence with the expansion interface.

2. The protective shell of claim 1, wherein the plate body further comprises a first through-hole in correspondence with the built-in antenna of the electronic device, and the first penetrating part is located at the first through-hole.

3. The protective shell of claim 1, wherein the auxiliary grounding element is copper foil.

4. The protective shell of claim 1, wherein the auxiliary grounding element is conductive foam.

5. The protective shell of claim 1, further comprising at least one sidewall disposed on at least one side of the plate body, the at least one sidewall and the plate body forming an accommodation space to accommodate at least a part of the electronic device; wherein the plate body and the sidewall are made of metallic material.

6. The protective shell of claim 2, wherein the plate body further comprises a second through-hole, and the protective shell further comprises a second penetrating part and an antenna structure, the second penetrating part located at the second through-hole and made of insulating material; the antenna structure located at the second penetrating part and electrically connected with the Pogo pin structure.

7. The protective shell of claim 6, wherein the antenna structure is a flexible printed circuit (FPC) antenna.

8. The protective shell of claim 6, wherein the antenna structure is a laser direct structuring (LDS) antenna.

* * * * *